June 27, 1944.   R. C. POTTS   2,352,407
BENDABLE FASTENER
Filed Aug. 2, 1943
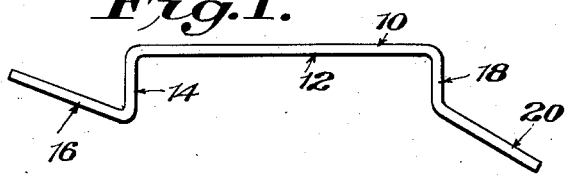
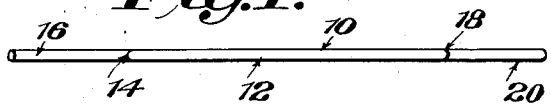
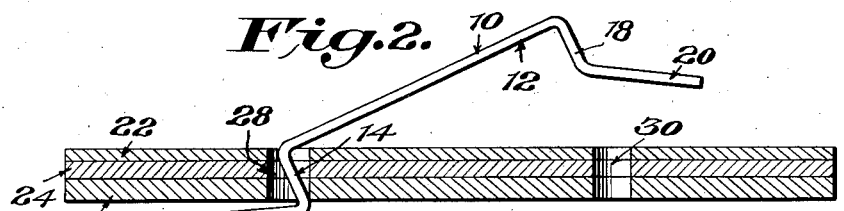
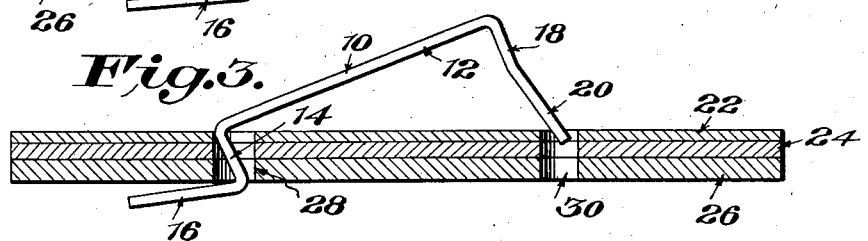
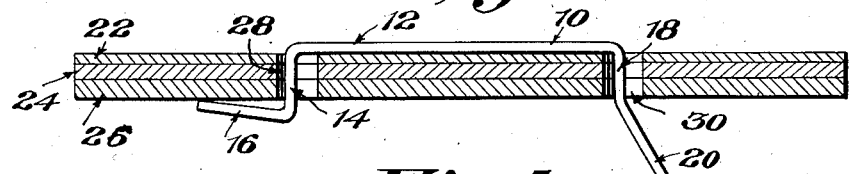
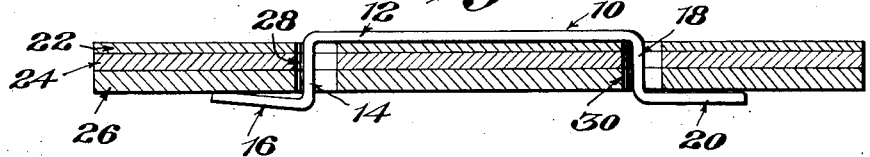
Inventor
Roy C. Potts,
By
Attorney Patented June 27, 1944

2,352,407

UNITED STATES PATENT OFFICE 2,352,407

BENDABLE FASTENER

Roy C. Potts, Takoma Park, Md.

Application August 2, 1943, Serial No. 497,062

2 Claims. (Cl. 24—153)

My invention relates to fasteners and has as its principal object to provide a preformed fastener which may be manually inserted to operative position to secure sheets of material together and which may be manually removed for disassembly of the secured parts.

It is a further object of this invention to provide a preformed fastener which may be made of a substantial gauge of metal such as No. 14 gauge (.080") round wire and which, when in final position, will tightly secure the parts to which it is applied.

The above and other objects of the present invention will be more fully understood from the following detailed description taken in connection with the annexed drawing in which:

Fig. 1 is a plan view of my improved fastener;

Fig. 1A is an elevation of the same fastener; and

Figs. 2, 3, 4, and 5 show consecutive steps in the application of the fastener.

The fastener comprises a length of wire 10 having a major body portion 12. At one end of the body portion 12 the wire is bent at right angle to form a leg 14 and at the end of the leg 14 the wire is bent to provide a member 16 which forms an angle less than 90° with the leg 14. At the opposite end of the body portion 12 the wire is bent to provide a leg 18 at right angle to the body portion 12 and parallel to the leg 14, and at the end of the leg 18 I provide a member 20 bent slightly away from the direction of the leg 18. All portions of the fastener lie substantially in the same plane.

Referring now to Figs. 2 to 5, inclusive, I show three sheets or boards 22, 24 and 26, to be secured by the fastener. Obviously, any number of sheets may be secured. The length of the legs 14 and 18 of the fastener 10 should approximate the composite thickness of the sheets to be secured and should not greatly exceed such thickness. If the legs 14 and 18 have a length somewhat less than the combined thickness of the sheets to be secured no harm will be done and some slight deficiency may even be advantageous in providing a tighter grip of the fastener.

The sheets to be secured, 22, 24 and 26, are provided with spaced preformed coincidental openings or holes 28 and 30. These should be so spaced that the distance from center to center approximates the length of the body 12 of the fastener. As shown in Fig. 2, the member 16 of the fastener 10 is thrust through the hole 28 and the fastener is manipulated to bring the leg 14 within the hole 28 and with the member 16 overlying the sheet 26. Manual pressure is then exerted upon the member 20 with the result that the leg 18 is flexed toward the body 12 and the angle of deviation of the member 20 from the leg 18 is substantially reduced. The member 20 is then inserted in the hole 30 as shown in Fig. 3 and the body 12 of the fastener 10 is pressed down upon the sheet 22 to the position illustrated in Fig. 4.

Due to the fact that the member 16 has been bent to less than a right angle to the leg 14, there is exerted a resilient tendency to lift the body 12 away from the sheet 22. With the parts in the position shown in Fig. 4, the leg 20 is then bent substantially to a right angle with the leg 18 and overlies the sheet 26. The relationship of the member 16 to the leg 14 continues to exert a tensioning effect, with the result that the parts 22, 24 and 26 are tightly held together.

One of the primary advantages of this type of fastener lies in the fact that it is both applicable and removable by hand. To secure this advantage, however, the stock from which the fastener is formed must not be too stiff or too resilient. Probably a stock similar to that used in "baling wire" is most suitable. The angle of the member 16 relative to the leg 14 should be only slightly less than 90°, so that flexure of the member 16 to a full 90° relationship with the leg 14 will not produce a permanent set of the metal. Similarly, the deviation of the member 20 from the direction of the leg 18 should be sufficiently slight so that the flexure of the leg 18 relative to the body 12 combined with the flexure of the member 20 relative to the leg 18 to bring about the relationship shown in Fig. 3 may be accomplished without giving the metal a permanent set. This is also important since too great an angle might make the final bending step illustrated in Fig. 5 not sufficiently great to produce a permanent set and such effect would keep the fastener from tightly gripping the members to be secured.

This fastener may be re-used a number of times if the stock is sufficiently mild. The preferred cross section of it is circular because such cross section lends itself to repeated bendings and, therefore, repeated use of the fastener. Any suitable cross section may, however, be used, such, for example, as square or rectangular. In the latter case, however, the major dimensions of the cross section must be transverse the length of the fastener. It is also possible and, from the standpoint of operation, desirable to have a rectangular configuration for the leg 18 and member 20 and an indentation where they join with the remainder of the fastener either square or round in cross section. It is questionable, however, whether in practice such an arrangement would produce sufficient advantage to justify the additional cost.

For obvious reasons, the legs 14 and 18 must be approximately parallel and must lie on the same side of the body portion 12. I have shown the members 16 and 20 as lying in the same plane with the legs 14 and 18. For the purpose of manufacture, as well as for packing and handling, such relationship is desirable. It is not, however, indispensable from the standpoint of operations and it is within the scope of this invention to have the members 16 and 20 lying at any angle relative to the body portion 12 so long as their relationship with their respective legs remains as described or to have the member 20 bent into a reverse right angle position to that shown in Fig. 5.

While I have disclosed one specific embodiment of my invention, I do not intend to be limited to the precise details as disclosed but only as set forth in the subjoined claims which are to be broadly construed.

What is claimed is:

1. A fastener formed from a length of metal wire having substantially uniform cross-sectional dimensions, said fastener being preformed so as to require only a single bending operation to bring it to final securing position, said fastener in condition for application comprising a substantially straight body portion, a leg at each end of said body portion and a member at the end of each leg, said body portion, legs and members all lying in substantially the same plane, both legs lying on the same side of said body portion and substantially at right angles thereto and each leg approximating in length the thickness of the combined parts through which they are intended to be inserted, the member at the end of one of said legs extending substantially at an acute angle to said leg and outwardly therefrom, and the member at the end of the other of said legs forming substantially an obtuse angle with said leg, and extending outwardly therefrom.

2. A fastener formed from a length of metal wire having substantially uniform cross-sectional dimensions, said fastener being preformed so as to require only a single bending operation to bring it to final securing position, said fastener in condition for application comprising a substantially straight body portion, a leg at each end of said body portion and a member at the end of each leg, said body portion, legs and members all lying in substantially the same plane, both legs lying on the same side of said body portion and substantially at right angles thereto and each leg approximating in length the thickness of the combined parts through which they are intended to be inserted, the member at the end of one of said legs extending substantially at an acute angle to said leg, and the member at the end of the other of said legs forming substantially an obtuse angle with said leg.

ROY C. POTTS.